United States Patent
Doran et al.

(10) Patent No.: US 10,805,424 B2
(45) Date of Patent: Oct. 13, 2020

(54) SYSTEM FOR SENDING DIGITAL REQUESTS FOR RESOURCE TRANSFERS

(71) Applicant: Bank of America Corporation, Charlotte, NC (US)

(72) Inventors: Daniel Paul Doran, Waxhaw, NC (US); Dean Lyons Henry, Charlotte, NC (US); Anand Ahuja, Hoboken, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 274 days.

(21) Appl. No.: 15/700,233

(22) Filed: Sep. 11, 2017

(65) Prior Publication Data

US 2019/0007519 A1  Jan. 3, 2019

Related U.S. Application Data

(60) Provisional application No. 62/526,908, filed on Jun. 29, 2017.

(51) Int. Cl.
*H04L 29/08* (2006.01)
*H04L 29/06* (2006.01)
*G06Q 20/02* (2012.01)

(52) U.S. Cl.
CPC .......... *H04L 67/32* (2013.01); *G06Q 20/027* (2013.01); *H04L 63/20* (2013.01); *H04L 67/20* (2013.01); *H04L 67/327* (2013.01)

(58) Field of Classification Search
CPC combination set(s) only.
See application file for complete search history.

(56) References Cited

U.S. PATENT DOCUMENTS

| | | | |
|---|---|---|---|
| 5,404,522 A | 4/1995 | Carmon et al. | |
| 5,909,594 A | 6/1999 | Ross et al. | |
| 5,918,055 A | 6/1999 | Crawford et al. | |
| 6,067,545 A | 5/2000 | Wolff | |
| 6,105,094 A | 8/2000 | Lindeman | |
| 6,240,458 B1 | 5/2001 | Gilbertson | |
| 6,717,690 B1 | 4/2004 | Salgado et al. | |
| 7,013,322 B2 | 3/2006 | Lahr | |
| 7,237,016 B1 | 6/2007 | Schober | |
| 7,363,651 B2 | 4/2008 | Jong et al. | |
| 7,512,715 B2 | 3/2009 | Marks et al. | |
| 7,519,726 B2 | 4/2009 | Pallyil et al. | |
| 7,607,131 B2 | 10/2009 | Oe et al. | |
| 7,613,704 B2 | 11/2009 | Lobo | |
| 10,402,829 B1 * | 9/2019 | Baar | G06Q 20/405 |
| 2002/0172273 A1 | 11/2002 | Baker et al. | |
| 2004/0019749 A1 | 1/2004 | Mochida et al. | |

(Continued)

*Primary Examiner* — Viet D Vu
(74) *Attorney, Agent, or Firm* — Michael A. Springs; Moore & Van Allen PLLC; Seongun M. Hong (57) ABSTRACT

The invention provides a gateway system for sending and coordinating digital requests for resource transfers amongst various computing systems. Typically, the various computing systems are configured to operate on different hardware and/or software platforms. Accordingly, the gateway system communicates with the various computing systems via an API, which provides an efficient way to coordinate resource transfers amongst the various computing systems while ensuring present and future compatibility with the various platforms during the resource transfer process.

12 Claims, 4 Drawing Sheets

(56) References Cited

U.S. PATENT DOCUMENTS

| | | |
|---|---|---|
| 2004/0054923 A1 | 3/2004 | Seago et al. |
| 2004/0059644 A1 | 3/2004 | Blau |
| 2004/0215718 A1 | 10/2004 | Kazmi et al. |
| 2007/0245010 A1 | 10/2007 | Arn et al. |
| 2008/0186931 A1 | 8/2008 | Prakash et al. |
| 2009/0119773 A1 | 5/2009 | D'amore et al. |
| 2009/0192913 A1* | 7/2009 | Saito ............... G06Q 20/20 705/26.1 |
| 2011/0320343 A1* | 12/2011 | Koh ................. G06Q 20/10 705/39 |
| 2012/0130885 A1* | 5/2012 | Feiereisen .......... G06Q 20/206 705/38 |
| 2015/0058486 A1* | 2/2015 | Huang ............... H04L 47/70 709/226 |
| 2015/0154418 A1* | 6/2015 | Redberg ............ G06F 21/602 713/165 |
| 2015/0178814 A1* | 6/2015 | Li ................... G06Q 20/12 705/26.8 |
| 2016/0117659 A1* | 4/2016 | Bedier .............. G06Q 20/204 705/16 |
| 2017/0054792 A1* | 2/2017 | Christopher, II ..... H04L 67/10 |
| 2017/0063953 A1* | 3/2017 | Niewczas ........... H04L 67/306 |
| 2018/0218176 A1* | 8/2018 | Voorhees ........... H04L 9/3239 |

* cited by examiner

SYSTEM FOR SENDING DIGITAL REQUESTS FOR RESOURCE TRANSFERS

CLAIM OF PRIORITY UNDER 35 U.S.C. § 119

This Non-Provisional Patent Application claims priority to Provisional Application No. 62/526,908 titled "SYSTEM FOR SENDING DIGITAL REQUESTS FOR RESOURCE TRANSFERS" filed Jun. 29, 2017, assigned to the assignee hereof and hereby expressly incorporated by reference herein.

FIELD OF THE INVENTION

The present invention embraces a system, computer program product, and method for sending digital resource requests.

BACKGROUND

Traditional computing systems may contain software used to coordinate resource transfers and requests for resource transfers. Typically, the software must be specifically programmed to be compatible with the various computing systems involved in the resource transfer process. As resource transfers become more technically complex and more computing systems are implicated, updating the program code to maintain compatibility with the various computing systems, which may be configured to operate on different, mutually incompatible hardware and/or software implementations, is often a difficult, technologically challenging task. Accordingly, there is a need for a more efficient way to ensure compatibility with the systems involved in the resource transfer while providing a seamless and transparent experience to the system's users during the process.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention provides a gateway system for sending and coordinating digital requests for resource transfers amongst various computing systems. Typically, the various computing systems are configured to operate on different hardware and/or software platforms. Accordingly, the gateway system typically communicates with the various computing systems via an API, which provides an efficient way to coordinate resource transfers amongst the various computing systems while ensuring present and future compatibility with the various platforms during the resource transfer process.

Embodiments of the present invention provide a system, computer program product, and a computer-implemented method for sending digital requests for resource transfers. The invention is configured for receiving a resource transfer request from a user computing system associated with a user; sending, over a network, the resource transfer request to a recipient computing system associated with a recipient; receiving, over the network, a selection of a resource platform from the recipient computing system; opening a secure communication channel with a first third party computing system; and executing, using the resource platform, a resource transfer according to the resource transfer request.

In some embodiments, the invention further comprises opening a secure communication channel with a second third party computing system.

In some embodiments, executing the resource transfer comprises transferring a resource from an account associated with the recipient to an account associated with the user, wherein the account associated with the recipient is associated with the first third party computing system, wherein the account associated with the user is associated with the second third party computing system.

In some embodiments, the invention further comprises determining, from historical data within a historical database, a pattern of interactions for the user and the recipient; and predicting one or more future actions of the user and the recipient.

In some embodiments, the invention further comprises recommending the one or more future actions of the recipient to the recipient.

In some embodiments, the resource transfer request comprises an interactive link that, when selected by the recipient, provides the recipient with access to the gateway application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the resource transfer system is implemented. The entity may be a business organization, a non-profit organization, a government organization, and the like. In some embodiments, the entity may be a financial institution.

"User" as used herein may refer to an individual who may utilize the system to send digital resource requests. Typically, the user is authorized by the entity to access the system. Accordingly, the user may be a customer of an entity who owns an account within the entity's system. In other embodiments, the user may be a potential customer of the entity.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing system may be a stationary unit such as a personal desktop computer, networked terminal, or server. In some embodiments, the computing system may be a local or remote server which is configured to send and/or receive inputs from other computing systems on the network.

"Account" as used herein may refer to a personalized record kept within an entity on behalf of a user. Each account is associated with a specific authorized user and contains information on resources owned by the user and held by the entity.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

"Gateway" as used herein may refer a hardware and/or software implementation for a framework configured to interface with and integrate a plurality of disparate computing systems and/or applications. Accordingly, the gateway may utilize an application programming interface (API) to interact with various systems. The gateway may be configured to integrate various platforms of third-party servers to process a transaction request provided by a user computing system. In this way, the system provides an efficient way for a user to send digital requests for resource transfers by providing the user with easy access to the most optimal platform. Typically, the gateway is owned and operated by an entity. In other embodiments, the gateway may be configured to use a non-API interface such as a host-to-host interface.

Embodiments of the present invention provide a system, computer program product, and method for sending a request for a resource transfer. In particular, the user is provided access to a centralized platform comprising a gateway owned and operated by an entity that allows the user to send a request for a transfer of resources to a known recipient. Typically, the user accesses the system via a user computing device through a user application. The user specifies a recipient to which the request for transfer of resources is to be sent. The gateway then sends a digital notification to the recipient, alerting the recipient that the user has requested a resource transfer. The gateway may then interface and communicate with the various third party servers needed to execute the resource transfer according to the parameters set by the user and the recipient. For instance, the user may set an amount of a particular resource to be transferred while the recipient may elect a particular service provider to execute the transfer of the resource. Typically, the gateway sends the request for a resource transfer to the recipient on behalf of the user.

Typically, the gateway is programmed to interface with various computing systems through an API rather than being hard-coded to interact with said computing systems. Structuring the gateway in this manner provides a number of technical advantages over traditional integration platforms. By utilizing an API, the system adds an additional layer of abstraction which increases the flexibility of the gateway with respect to the different platforms with which the gateway may interact. For example, as long as the gateway is programmed to interact with the different platforms through an API, support for additional platforms may be added to the gateway without changing the program code of the gateway to be specifically compatible with the additional platforms. In this way, the computing efficiency of the system is increased by avoiding the need to spend computing resources to manually update the code of the gateway for compatibility with the various platforms. Said computing resources may include processing power, memory space, storage space, cache space, electric power, and networking bandwidth.

The system may comprise a data analytics engine and a historical database which aggregates historical data on user and recipient interactions. For instance, the historical data may contain data on the instances in which the user has accessed the system to send requests or set user preferences. The historical data may further include information on the platform selected by the recipient to execute the resource transfer. The data analytics engine may, by reading the historical data, predict certain future actions taken by the user and/or the recipient. For instance, the data analytics engine may predict that the user may request a resource transfer of a certain amount on a certain day. In other embodiments, the data analytics engine may predict that a recipient will utilize a particular platform upon receiving a request for a resource transfer. In such embodiments, the data analytics engine may prompt the user and/or the recipient to accept or reject the predicted/proposed action. Upon receiving an acceptance of the predicted action, the system may automatically execute the action on behalf of the user and/or recipient. In this way, the user and/or recipient is able to bypass one or more of the steps involved in requesting or executing a transfer of resources, which further increases the computing efficiency of the digital request system.

Figure 1:
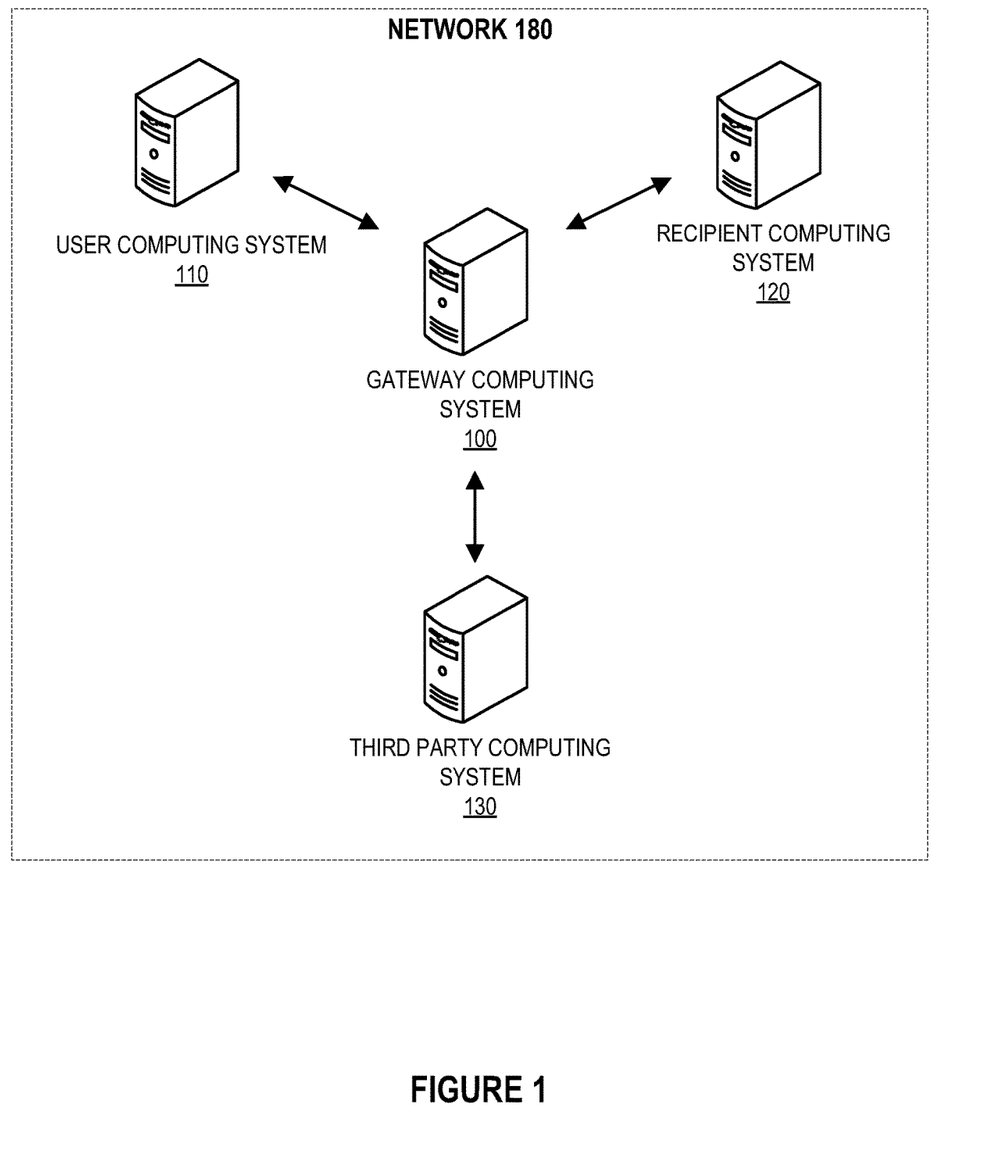
FIG. 1 depicts an operating environment, in accordance with one embodiment of the present invention.

FIG. 1 is a block diagram illustrating an operating environment, in accordance with one embodiment of the present invention. The operating environment may include a gateway computing system 100 in operative communication with a user computing system 110, a recipient computing system 120, and a third party computing system 130 over a network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180.

The gateway computing system 100 comprises the hardware and software necessary to run the gateway application, which coordinates receiving and sending resource transfer requests and executing the transfer requests by communicating with the user computing system 110, the recipient computing system 120, and the third party computing system 130 through an API. Typically, the gateway computing system 100, the user computing system 110, the recipient computing system 120, and the third party computing system 130 are owned and operated by individual entities. Accordingly, it should be understood by those of ordinary skill in the art that the various devices and computing systems as depicted herein may be embodied in a single device or computing system or multiple devices and/or computing systems operatively connected to one another in a distributed fashion. For instance, the gateway computing system 100 as depicted herein may be owned and operated by a first entity and comprise a series of computing systems acting in parallel to execute the functions of the gateway computing system 100.

The user computing system 110 may be owned and operated by a second entity which accesses the gateway application on the gateway computing system 100 to send requests for resource transfers to one or more recipients. In some embodiments, the second entity may be an organization, such as a business entity, which may send a digital resource transfer request to a recipient. The recipient may be a third entity, such as another business entity, which owns and operates the recipient computing system 120. The first entity, which owns and operates the gateway computing system 100 may be, for example, a financial institution. In an exemplary embodiment, the first entity may store a database of customer accounts within the user computing system 110, where the database contains a list of past due customer invoices for goods and/or services provided. In such an embodiment, the second entity may be a business customer of the first entity with a past due invoice. The first entity may, using the user computing system 110, log onto the gateway application on the gateway computing system 100 to send a digital resource transfer request to the second entity.

In some embodiments, the resource transfer request may be a request for payment. In some embodiments, the gateway computing system 100 may continuously monitor the database within the user computing system 110 for past due invoices. Upon detecting a past due invoice, the gateway computing system 100 may automatically send the resource transfer request to the recipient computing system 120. The resource transfer request may be sent through a number of different communication methods and/or protocols, including e-mail, SMS, MMS, instant messaging, file transfer protocols, text messaging, web portal access, and the like. Typically, the resource transfer request will include a payment amount and a hyperlink which allows the recipient to access a payment interface on the gateway computing system 100. For instance, the hyperlink may be configured to open a web browser on the recipient computing system 120 to access a web site/server on the gateway computing system 100 which provides a number of different payment platforms through which the recipient may make the requested payment. To support the various payment platforms, the gateway computing system 100 may be configured to communicate with one or more third party computing systems 130 via an API, where the third entity which owns and/or operates the third party computing system 130 may be, for example, a financial institution which processes the payment. In this way, the system is able to maintain compatibility with various disparate payment platforms without being hard-coded to be compatible with said payment platforms. Thus, if new payment platforms were to be added or existing platforms were to be removed, the system may continue to operate with minimal interruption.

The recipient may be able to select from the numerous platforms to complete the resource transfer. In some embodiments, the recipient may select a payment platform based on the recipient's preferences. In some embodiments, the gateway computing system 100 may store the interactions with the recipient within a historical database. The interactions stored may include, for instance, the payment platform used by the recipient, the amount of time elapsed between the time the payment request was sent and the payment was made, the amount paid by the recipient, and the like. Based on the historical data, the data analytics engine within the gateway computing system 100 may determine a pattern of behavior for a particular recipient and predict that the recipient may use a particular payment platform in the future. The gateway computing system 100 may then, upon sending a resource transfer request to the recipient in the future, recommend that the recipient use the predicted payment platform and subsequently query the recipient to confirm whether the recipient wishes to use the predicted payment platform. In some embodiments, the gateway computing system 100 may present to the recipient a number of rewards to use a particular payment platform over another. For instance, the system may provide a lower interest rate, provide reward points, credits, discounts, more lenient repayment periods, and the like if the recipient selects a particular bank to conduct the transaction. The system may then calculate and recommend the optimum payment platform for the recipient based on the recipient's payment history. For example, if the recipient has historically favored the greatest possible discounts, or if the recipient favors longer repayment periods, the system will recommend a payment platform accordingly. In some embodiments, the system may limit the types of payment methods based on the recipient. For instance, the system may avoid offering a potentially unsecure recipient the option to pay using certain payment methods (e.g. electronic check) and instead opt to provide the recipient with more secure payment methods.

Once the recipient selects a payment method, the gateway computing system 100 may receive the acceptance of the payment using a particular payment platform from the recipient computing system 120. The gateway computing system 100 may then establish a secure communication channel with the third party computing system 130 which corresponds to the payment platform chosen by the recipient. The gateway computing system 100 may then coordinate the transfer of resources, such as funds, from an account associated with the recipient to an account associated with the user. In some embodiments, it may be necessary for the gateway computing system 100 to securely communicate with multiple third party computing systems 130, particularly when the account associated with the recipient is hosted on a third party computing system 130 owned and/or operated by one entity and the account associated with the user is hosted on a third party computing system 130 owned and/or operated by a separate, different entity. In such embodiments, the gateway computing system 100 will coordinate with the third party computing systems 130 of both entities to ensure a secure transfer from the account associated with the recipient to the account associated with the user.

In some embodiments, the gateway computing system 100 may include a logic engine which is configured to receive inputs from smart contracts stored within the database, with each smart contract being associated with a recipient. "Smart contract" as used herein may refer to a computer program which executes certain transactions based on the smart contract's protocols. For instance, a recipient may wish to establish a protocol by which the system automatically draws resources from a secondary platform/account in the event that the primary platform/account is lacking the resources to conduct the transfer. The recipient may wish to establish such a protocol to prevent the interruption of delivery of goods and/or services from the user. In such an embodiment, the gateway computing system 100 may be programmed with a smart contract such that if the system detects that a primary platform/account will not meet the requirements to complete the resource transfer, the system automatically arranges for the resource transfer using the secondary platform/account according to the programming of the smart contract. In some embodiments, the smart contracts may include code portions to automatically check the condition of the recipient's selected account for the transfer. If the account does not contain adequate resources to cover the transfer, the smart contract may contain failure prevention code that automatically prevents the transfer from occurring.

Upon successfully coordinating the resource transfer, the gateway computing system 100 may automatically associate the successful completion of the resource transfer with the past due invoice associated with the recipient. The gateway computing system 100 may then automatically update the database within the user computing system 110 to reflect the payment of the past due invoice. In this manner, the system is able to efficiently manage resource transfer requests by maintaining compatibility with a number of different platforms while avoiding the waste of computing resources associated with manually reconciling invoices with payments. Furthermore, by increasing the transparency and ease of complying with payment requests, the system solves the computing-centric challenge of removing technical barriers to executing resource transfers in time-sensitive situations.

Figure 2:
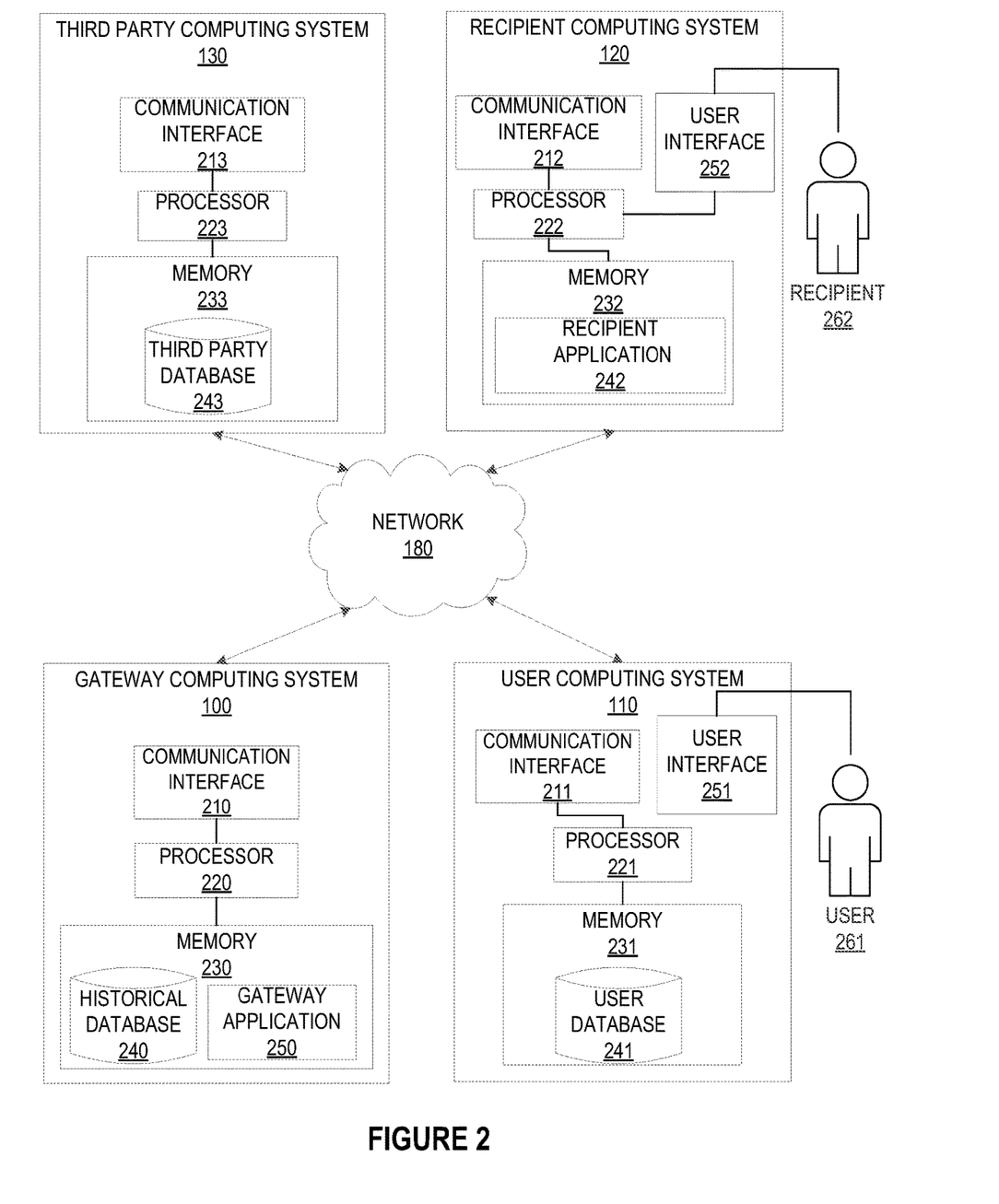
FIG. 2 depicts a schematic illustrating the gateway computing system, the user computing system, the recipient computing system, and the third party computing system in more detail, in accordance with one embodiment of the present invention.

FIG. 2 is a block diagram illustrating the gateway computing system 100, the user computing system 110, the recipient computing system 120, and the third party computing system 130 in more detail, in accordance with one embodiment of the present invention. The gateway computing system 100 typically contains a processor 220 communicably coupled to such devices as a communication interface 210 and a memory 230. The processor 220, and other processors described herein, typically includes circuitry for implementing communication and/or logic functions of the various computing systems, including the interface computing system 100. For example, the processor 220 may include a digital signal processor device, a microprocessor device, and various analog to digital converters, digital to analog converters, and/or other support circuits.

The gateway computing system 100 may use the communication interface 210 to communicate with other devices over the network 180. The communication interface 210 as used herein may include an Ethernet interface, an antenna coupled to a transceiver configured to operate on a cellular data or WiFi signal, and/or a near field communication ("NFC") interface.

The gateway computing system 100 may include a memory 230 operatively coupled to the processor 220. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. The gateway application 250 may be stored within the memory 230 of the gateway computing system 100. When executed, gateway application 250 may securely communicate with the user computing system 110, recipient computing system 120, and the third party computing system 130 through an API to coordinate the request for resource transfers and the transfer of the resources amongst the various systems. The historical database 240 may be stored within the memory 230, where the historical database 240 may include data associated with the interactions of the system with the user computing system 110, the recipient computing system 120, and the third-party computing system 130. The memory 230 may store a data analytics engine, which reads the historical data within the historical database 240 to predict future actions taken by the user computing system 110 and/or the recipient computing system 120. The memory 230 may further store a logic engine which implements smart contracts to execute certain functions based on predefined conditions by the user and/or the recipient. Typically, the gateway computing system 100 is owned and/or operated by a first entity such as a financial institution which provides services to the various parties.

The user computing system 110 may comprise a communication interface 211, a processor 221, and a memory 231 having a user database 241 stored thereon. The user database 241 may comprise account data associated with one or more recipients 262. For instance, the account data may include past due invoices associated with a particular recipient 262. Typically, the user computing system 110 is owned and operated by a second entity, such as a business organization. The user 261, who is typically associated with the second entity (e.g. a representative), may log on to the gateway computing system 100 to access the gateway application 250 through the user interface 251. The user 261 may select from a number of options concerning the conditions under which the resource transfer requests are to be sent, such as the request method, the time of day, the amount to be requested, and the like. The user 261 may further configure the gateway computing system 100 to automatically read the account data within the user database 241 to automatically generate and send resource transfer requests to the recipient 262 based on certain conditions, such as a past due invoice associated with the recipient 262.

The recipient computing system 120 typically also includes a 222 operatively coupled to a communication interface 212 and a memory 232. The memory 232 may contain a recipient application 242 which causes the processor 323 to display a user interface 252 to a recipient 262. It should be understood that the display on which the user interface 252 as presented may include an integrated display (e.g. a tablet or smartphone screen) within the recipient computing system 120, or an external display device (e.g. a computer monitor or television). Typically, the recipient computing system 120 is owned and/or operated by a third entity, such as another business entity. The recipient application 242 may comprise the application code needed for the recipient 262 to access the gateway application 250. In an exemplary embodiment, the recipient 262 may receive a resource transfer request from the gateway computing system 100 on behalf of the user computing system 110. The resource transfer request may contain a link that, when activated by the recipient 262, triggers the recipient application 242 to access the gateway application 250. The recipient application 242 may, for example, be a web browser which accesses a web site/server stored on the gateway computing system 100. The recipient 262 may then select a platform through which to complete the resource transfer, based on preference or by recommendations by the gateway computing system 100 according to the recipient's past transactions and/or rewards associated with using a particular platform over another.

The third party computing system 130 typically includes a processor 223 operatively coupled to a communication interface 213 and a memory 233 having a third party database 243 stored thereon. Typically, the third party computing system 130 is owned and/or operated by a fourth entity, such as another financial institution. The third party database 243 may store account data associated with the user and/or the recipient. Typically, the third party computing system 130 is associated with the platform which the recipient 262 has selected to conduct the resource transfer and/or the platform which the user 261 has selected to receive the resource transfer. In an exemplary embodiment, the fourth entity may be a bank with which the recipient 262 has an account. The third party database 243 may contain the recipient's 262 account information, including the amount of funds available in the recipient's account. In some embodiments, the third party database 243 may further contain the user's 261 account information. In such an embodiment, the gateway computing system 100 may execute the resource transfer from the recipient's 262 account to the user's 261 account by securely communicating the transfer to the third party computing system 130.

Figure 3:
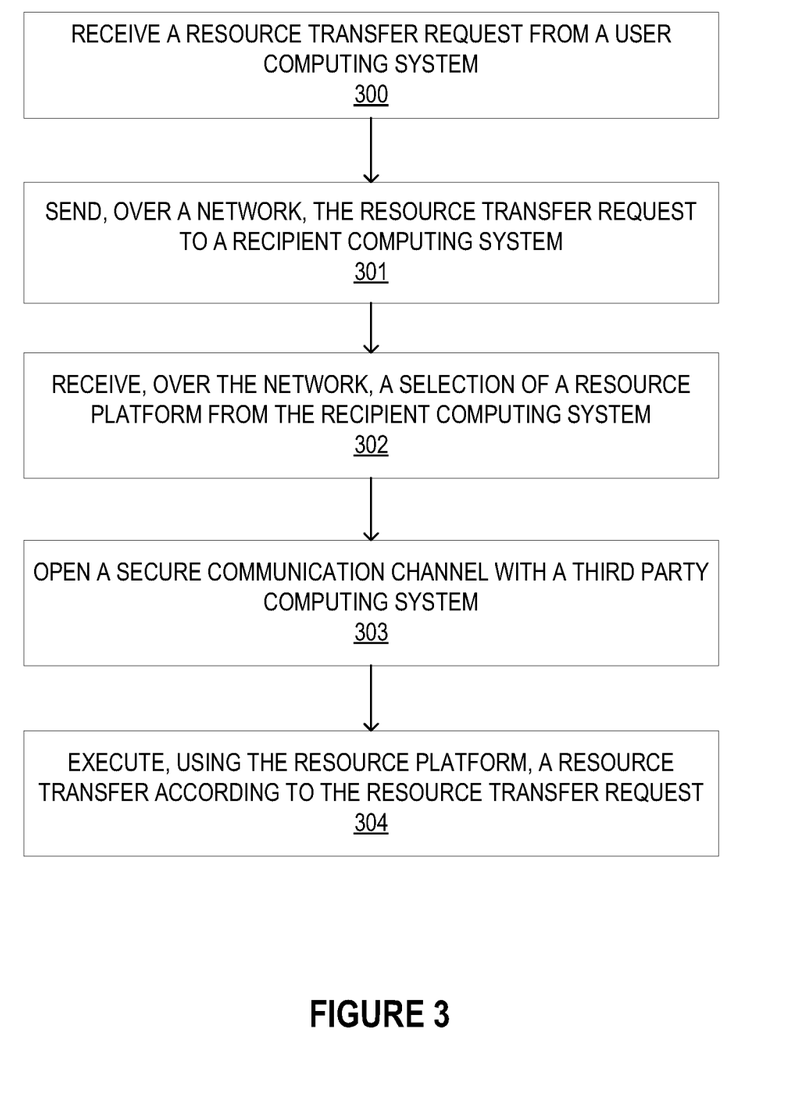
FIG. 3 depicts a process flow illustrating a method for sending digital resource transfer requests, in accordance with one embodiment of the present invention.

FIG. 3 illustrates a process flow of the resource transfer request system, in accordance with one embodiment of the present invention. The process begins at block 300, where the system receives a resource transfer request from a user computing system. In some embodiments, the user computing system will be owned and operated by a first business entity with a number of unpaid invoices associated with a second business entity. Accordingly, the user computing system may request that a resource transfer request is sent (e.g. typically a request for a payment of at least a portion of the invoice) to the second business entity (e.g. the resource transfer request recipient). In some embodiments, the request may be made manually by the user computing system accessing the gateway application on the gateway computing system over the network. In other embodiments, the user computing system may contain a user database containing the unpaid invoices associated with the recipients, where the gateway computing system is authorized to continuously monitor the user database for unpaid invoices. Once the system detects an unpaid invoice within the user database, the gateway computing system may automatically generate a resource transfer request based on the data within the unpaid invoice. The system may further examine the historical data associated with the user to predict that the user will request a resource transfer at a certain time. In such embodiments, the system may prompt the user to confirm that the user wishes to send a resource transfer to the predicted recipient at the predicted time. Typically, the user may select one or more modes of communication through which the resource transfer request is sent, which may include e-mail, IM, DM, SMS, MMS, file transfers, automated calls, and the like. The user also typically sets the amount of resource to be requested (e.g. the user may request payment of the full amount on the invoice). Generally, the gateway computing system communicates with the user computing system via an API.

The process continues to block 301, where the system sends, over a network, the resource transfer request to a recipient computing system. The network as used herein may include, for example, the internet or cellular networks through which the resource transfer request may be sent. Typically, the resource transfer request includes the amount of resources requested by the user. The resource transfer request may contain a notification to the recipient that references a particular invoice and notifies the recipient that the particular invoice is past due. The resource transfer request may further include an interactive link that may be selected via the recipient computing system. Once the recipient selects the interactive link, the gateway computing system causes an interface to be displayed to the recipient, where the interface comprises a list of resource platforms that the recipient may select to conduct the resource transfer. In some embodiments, the resource platforms are payment platforms such as ACH, credit card systems, Bitcoin, and the like. The system may be configured to interact with the various resource platforms via an API, thereby ensuring future compatibility with additional resource platforms to be added to the system. The system may further provide to the recipient a comparison of the various resource platforms and the benefits of using one platform over another. For instance, the system may be configured to display such beneficial information to the user such as longer repayment periods, lower interest rates, discounts, point rewards, benefits such as payment protections, and the like.

The process continues to block 302, where the system receives, over the network, a selection of a resource platform from the recipient computing system. In some embodiments, the recipient may select a resource platform according to the recipient's preferences. In other embodiments, the system may, based on historical data associated with the recipient, predict that the recipient intends to use a particular resource platform in the future. In such embodiments, the system may query the recipient to confirm that the recipient wishes to utilize the predicted resource platform in a particular instance. In some embodiments, the system may, based on the historical data associated with the recipient and the comparison data with respect to the various resource platforms, recommend that the recipient utilizes a particular platform to execute the resource transfer. For example, the system may detect that the recipient often utilizes payment platforms that allow for long repayment periods. In such an embodiment, the system may recommend that the recipient utilize a resource platform that offers these benefits, even if another resource platform may offer higher discounts and the like. Upon receiving a selection of the recommended resource platform by the recipient, the system may update the historical database to indicate that the recipient accepted the selection of the recommendation in such an instance.

The process continues to block 303, where the system opens a secure communication channel with a third party computing system. Generally, the gateway computing system communicates with third party computing systems through an API, thereby ensuring that the gateway application does not need to be hard-coded to be compatible with the various resource platforms, which may use different software and/or hardware implementations. Typically, the system communicates with a first third party computing system which is associated with the resource platform chosen by the recipient. In some embodiments, the recipient may have an account with the entity of the first third party computing system from which the resources are to be drawn to execute the resource transfer. In some embodiments, the user may also have an account with the entity of the first third party computing system to which the resources are to be transferred. In other embodiments, the user may have an account with an entity of a second third party computing system. In such embodiments, the gateway computing system may open a second secure communication channel with the second third party computing system to access the user's account information.

The process concludes at block 304, where the system executes, using the resource platform, a resource transfer according to the resource transfer request. Generally, the resource transfer request will specify an account of the user to which the resources are to be transferred. Once the system verifies the recipient account from which to draw resources and the user account to which to transfer resources, the system coordinates the communication amongst the one or more third party computing systems to transfer resources from the recipient account to the user account. Typically, the system will draw resources from the recipient account using the resource platform selected by the recipient, while the system will transfer resources to the user account according to the user's preferences as contained within the resource transfer request. In some embodiments, the system may determine that the resource transfer between the recipient account and the user account has been successfully completed. Upon detecting the successful completion of the resource transfer, the system may automatically update the user database to reflect the successful transfer. For instance, if the requested resource transfer was a request for payment of a past due invoice, the system may automatically associate the payment sent from a recipient with the past due invoice paid, thus ensuring that the user's database accurately reflects the status of the invoice. In this way, the system provides a seamless and transparent way to conduct resource transfers and resource transfer requests from various parties using various different software and/or hardware platforms.

Figure 4:
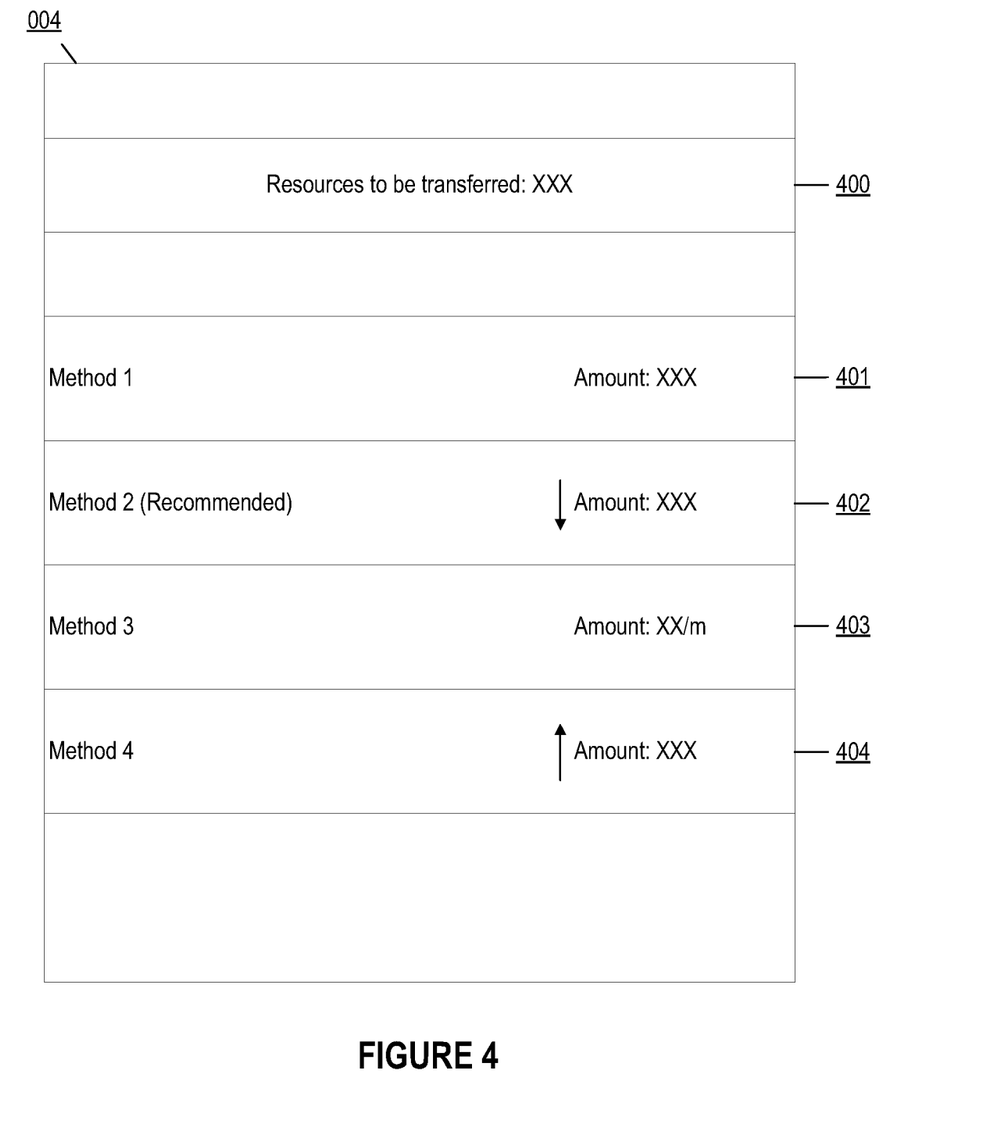
FIG. 4 depicts a schematic illustrating a graphical user interface presented to the recipient, in accordance with one embodiment of the present invention.

FIG. 4 depicts a schematic illustrating a graphical user interface 004 presented to the recipient, in accordance with one embodiment of the present invention. The recipient application stored in the memory of the recipient computing device may cause the processor to display the graphical user interface, which may be presented to the recipient via a display of the user interface within the recipient computing system. The graphical user interface may display the amount of resources to be transferred at 400, where the value of the amount of resources to be transferred is set by the user. For example, the user may set the amount of funds to be transferred from the recipient to the user for goods or services rendered to the recipient by the user (i.e. the amount due on the invoice).

The graphical user interface may also display a plurality of methods 401, 402, 403, 404 through which the recipient may conduct the transfer of resources. Each method represents a different platform through which to complete the resource transfer, and thus the actual amount of resources transferred from the recipient may be greater to, equal to, or less than the total amount of resources to be transferred as set by the user. The graphical user interface may further be configured to allow the recipient to select the preferred method of transferring resources via interactive links which correspond to teach method. Once the user clicks the interactive link corresponding with the selected method, the system may initiate the resource transfer process according to the selected method.

For instance, method 1 at 401 may represent a payment of an invoice via ACH. As seen on the right side of 401, the amount of resources to be transferred from the recipient is equal to the amount of resources requested by the user. Method 2 at 402 may represent a payment of an invoice via a third party payment platform, such as a credit card. As seen in 402, the system may provide a reward for using method 2 as the payment platform. For instance, the system may provide a discount such that the recipient may satisfy the amount due on the invoice by transferring a smaller amount of resources than the total amount of resources requested by the user. The graphical user interface may further include a visual aid to represent the rewards offered by the system (e.g. a "down" arrow) as well as an indication of the recommended payment platform.

The graphical user interface may further display method 3 at 403, which represents a platform through which resources may be transferred in increments. For instance, method 3 may represent a payment platform which includes a repayment plan through which the recipient may pay the amount due on the invoice in installments on a periodic basis.

Finally, the graphical user interface may further display method 4 at 404, which represents a platform that requires the recipient to transfer a greater amount of resources than the amount requested by the user. For instance, method 4 may be associated with a payment platform that assesses various transaction costs to complete the transaction, which in turn will require the recipient to pay a greater amount than what is listed on the due invoice. The graphical user interface may further be configured to indicate visually that certain methods (e.g. method 4) requires a transfer of a greater amount of resources than what is due on the invoice, such as by displaying an "up" arrow.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A gateway system for sending digital requests for resource transfers, comprising:
   a processor;
   a communication interface; and
   a memory having a gateway application stored therein, wherein the gateway application, when executed by the processor, causes the processor to:
      read, using a data analytics engine, historical data associated with a user;
      predict, based on the historical data associated with the user, that the user wishes to transmit a resource transfer request to a recipient at a predicted time;
      prompt the user to confirm transmission of the resource transfer request to the recipient at the predicted time;
      receive, from a user computing system associated with the user, confirmation of the transmission of the resource transfer request at the predicted time;
      send, over a network, the resource transfer request to a recipient computing system associated with the recipient at the predicted time;
      read, using the data analytics engine, historical data associated with the recipient;
      predict, based on the historical data associated with the recipient, that the recipient wishes to use a first resource platform;
      prompt the recipient to confirm a selection of the first resource platform;
      receive, over the network, confirmation of the selection of the first resource platform from the recipient computing system;
      open a secure communication channel with a first third party computing system, wherein the first third party computing system is associated with the first resource platform;

detect that the first resource platform does not meet requirements to complete the resource transfer request;

based on detecting that the first resource platform does not meet the requirements to complete the resource transfer request, automatically, via a smart contract, select a second resource platform to complete the resource transfer request; and execute, using the second resource platform, a resource transfer according to the resource transfer request.

2. The system according to claim 1, wherein the gateway application further causes the processor to open a secure communication channel with a second third party computing system.

3. The system according to claim 2, wherein executing the resource transfer comprises transferring a resource from an account associated with the recipient to an account associated with the user, wherein the account associated with the recipient is associated with the first third party computing system, wherein the account associated with the user is associated with the second third party computing system.

4. The system according to claim 1, wherein the resource transfer request comprises an interactive link that, when selected by the recipient, provides the recipient with access to the gateway application.

5. A computer program product for sending digital requests for resource transfers, the computer program product comprising at least one non-transitory computer readable medium having computer-readable program code portions embodied therein, the computer-readable program code portions comprising:

an executable portion for reading, using a data analytics engine, historical data associated with a user;

an executable portion for predicting, based on the historical data associated with the user, that the user wishes to transmit a resource transfer request to a recipient at a predicted time;

an executable portion for prompting the user to confirm transmission of the resource transfer request to the recipient at the predicted time;

an executable portion for receiving, from a user computing system associated with a user, confirmation of the transmission of the resource transfer request at the predicted time;

an executable portion for sending, over a network, the resource transfer request to a recipient computing system associated with the recipient at the predicted time;

an executable portion for reading, using the data analytics engine, historical data associated with the recipient;

an executable portion for predicting, based on the historical data associated with the recipient, that the recipient wishes to use a first resource platform;

an executable portion for prompting the recipient to confirm a selection of the first resource platform;

an executable portion for receiving, over the network, confirmation of the selection of the first resource platform from the recipient computing system;

an executable portion for opening a secure communication channel with a first third party computing system, wherein the first third party computing system is associated with the first resource platform;

an executable portion for detecting that the first resource platform does not meet requirements to complete the resource transfer request;

an executable portion for, based on detecting that the first resource platform does not meet the requirements to complete the resource transfer request, automatically, via a smart contract, selecting a second resource platform to complete the resource transfer request; and an executable portion for executing, using the second resource platform, a resource transfer according to the resource transfer request.

6. The computer program product according to claim 5, the computer-readable program code portions further comprising an executable portion for opening a secure communication channel with a second third party computing system.

7. The computer program product according to claim 6, wherein executing the resource transfer comprises transferring a resource from an account associated with the recipient to an account associated with the user, wherein the account associated with the recipient is associated with the first third party computing system, wherein the account associated with the user is associated with the second third party computing system.

8. The computer program product according to claim 5, wherein the resource transfer request comprises an interactive link that, when selected by the recipient, provides the recipient with access to a gateway application.

9. A computer-implemented method for sending digital requests for resource transfers, said method comprising:

reading, using a data analytics engine, historical data associated with a user;

predicting, based on the historical data associated with the user, that the user wishes to transmit a resource transfer request to a recipient at a predicted time;

prompting the user to confirm transmission of the resource transfer request to the recipient at the predicted time;

receiving, from a user computing system associated with the user, confirmation of the transmission of the resource transfer request at the predicted time;

sending, over a network, the resource transfer request to a recipient computing system associated with the recipient at the predicted time;

reading, using the data analytics engine, historical data associated with the recipient predicting, based on the historical data associated with the recipient, that the recipient wishes to use a first resource platform;

prompting the recipient to confirm a selection of the first resource platform;

receiving, over the network, confirmation of the selection of the first resource platform from the recipient computing system;

opening a secure communication channel with a first third party computing system, wherein the first third party computing system is associated with the first resource platform;

detecting that the first resource platform does not meet requirements to complete the resource transfer request;

based on detecting that the first resource platform does not meet the requirements to complete the resource transfer request, automatically, via a smart contract, selecting a second resource platform to complete the resource transfer request; and executing, using the second resource platform, a resource transfer according to the resource transfer request.

10. The computer-implemented method according to claim 9, the method further comprising opening a secure communication channel with a second third party computing system.

11. The computer-implemented method according to claim 10, wherein executing the resource transfer comprises transferring a resource from an account associated with the recipient to an account associated with the user, wherein the account associated with the recipient is associated with the first third party computing system, wherein the account associated with the user is associated with the second third party computing system.

12. The computer-implemented method according to claim 9, wherein the resource transfer request comprises an interactive link that, when selected by the recipient, provides the recipient with access to a gateway application.

* * * * *